United States Patent
Nishikawa

(10) Patent No.: US 7,236,317 B2
(45) Date of Patent: Jun. 26, 2007

(54) MAGNETIC TRANSFER METHOD

(75) Inventor: Masakazu Nishikawa, Odawara (JP)

(73) Assignee: Fujifilm Corporation, Tokyo (JP)

( * ) Notice: Subject to any disclaimer, the term of this patent is extended or adjusted under 35 U.S.C. 154(b) by 1302 days.

(21) Appl. No.: 09/843,889

(22) Filed: Apr. 30, 2001

(65) Prior Publication Data

US 2001/0046097 A1 Nov. 29, 2001

(30) Foreign Application Priority Data

Apr. 28, 2000 (JP) .............................. 2000-130306

(51) Int. Cl.
*G11B 5/86* (2006.01)
(52) U.S. Cl. ....................................................... 360/16
(58) Field of Classification Search ................... 360/16, 360/15, 131, 17; 428/694 R
See application file for complete search history.

(56) References Cited

U.S. PATENT DOCUMENTS

| | | | |
|---|---|---|---|
| 5,353,169 A | 10/1994 | Jeffers et al. | |
| 5,991,104 A | 11/1999 | Bonyhard | |
| 6,469,848 B1 * | 10/2002 | Hamada et al. | ............... 360/17 |

FOREIGN PATENT DOCUMENTS

| | | | |
|---|---|---|---|
| EP | 0 915 456 A1 | 5/1999 | |
| EP | 1 143 423 A2 | 10/2001 | |
| EP | 1 143 424 A2 | 10/2001 | |
| JP | 10-40544 A | 2/1998 | |
| JP | 10-269566 A | 10/1998 | |
| JP | 10-312535 A | 11/1998 | |
| JP | 10-320768 A | 12/1998 | |

OTHER PUBLICATIONS

European Search Report dated Oct. 4, 2002.

* cited by examiner

*Primary Examiner*—David Hudspeth
*Assistant Examiner*—Glenda P. Rodriguez
(74) *Attorney, Agent, or Firm*—Sughrue Mion, PLLC

(57) ABSTRACT

A magnetic transfer method for transferring a magnetic recording information on a master carrier for magnetic transfer to a slave medium by bringing the master carrier for magnetic transfer with a magnetic layer with magnetic recording information recorded thereon into close contact with the slave medium where the information is to be transferred, whereby initial DC magnetization is performed on the slave medium in advance in track direction, and using a magnetic material having a product ($Ms \cdot \delta$) of saturation magnetization ($Ms$) and magnetic layer thickness ($\delta$) within the range of 0.025 T·μm (20 G·μm)–2.3 T·μm (1830 G·μm) inclusive as the master carrier for magnetic transfer, the slave medium after the initial DC magnetization is brought into close contact with the master carrier, and a magnetic field for transfer is applied in a direction opposite to the direction of the initial DC magnetization of the slave surface, and magnetic transfer is performed.

4 Claims, No Drawings

MAGNETIC TRANSFER METHOD

BACKGROUND OF THE INVENTION

The present invention relates to a magnetic transfer method for transferring a recording information to a magnetic recording medium used in a large capacity and high recording density magnetic recording and reproducing system. In particular, the invention relates to a magnetic transfer method to be used in the recording of servo signal, address signal, other normal video signal, audio signal, data signal, etc.

With rapid propagation and progress in the technique to utilize digital image, the amount of information processed by devices such as personal computer has extensively increased. To cope with the increase of the amount of information, there are now strong demands on a magnetic recording medium, which has large capacity for information recording and is available at low cost, and further, can record and read within shorter time.

In a high density recording medium, e.g. hard disk or large capacity removable type magnetic recording medium such as ZIP (Iomega Inc.), the information recording region has narrower tracks compared with floppy disk. In order to accurately scan the magnetic head with narrower track width and to record and reproduce signals at high S/N ratio, it is necessary to perform accurate scanning by using tracking servo technique.

In a large capacity magnetic recording medium such as hard disk or removable type magnetic recording medium, there are provided regions where servo signal for tracking, address information signal, reproduction clock signal, etc. are recorded at a given angular spacing. The magnetic head reproduces these signals at a given spacing and accurately scans on the track while confirming and correcting the position of the head. These signals are recorded on the magnetic recording medium in advance by the so-called "preformat" process when the magnetic recording medium is manufactured.

Accurate positioning is required for recording of servo signal for tracking, address information signal, reproduction clock signal, etc. In this respect, after the magnetic recording medium is incorporated in the drive, the preformat recording is performed by the magnetic head under strict position control using a special-purpose servo recording system.

However, in the preformat recording of servo signal, address signal, and reproduction clock signal, recording is performed under strict position control of the magnetic head using a special-purpose servo recording system, and this means that much time is required for the preformat recording. Also, magnetic recording density is increased and the amount of signals to be recorded by the preformat recording is also increased, and this means that much more time is required. The percentage of the cost required for the preformat recording process of servo signal in the total manufacturing cost of the magnetic recording medium is increased, and there are now strong demands on the reduction of the cost in this process.

On the other hand, a method is proposed, by which magnetic transfer of a preformat information is performed from the master carrier to the slave medium without recording the preformat information track by track. For instance, JP-63-183623 and EP-0915456 (JP-10-040544, JP-10-269566) describe such transfer technique.

According to the methods described in JP-63-183623 or EP-0915456, surface irregularities (i.e. convex and concave portions) corresponding to an information signal are formed on the surface of a substrate used as a master carrier for magnetic transfer, and a ferromagnetic thin film is formed at least on the surface of convex portions among the surface irregularities of the master carrier for magnetic transfer. The surface of the master carrier is brought into contact with the surface of a sheet-type or a disk-type magnetic recording medium where a ferromagnetic thin film or a coating layer of a composition containing ferromagnetic powder is formed. Or, AC bias magnetic field or DC magnetic field is applied on the surface, and the ferromagnetic material on the surface of the convex portions is excited. Thus, a magnetization pattern corresponding to the surface irregularities (convex and concave portions) is recorded on the magnetic recording medium. According to this method for magnetic transfer, the surface of convex portions of the master carrier for magnetic transfer is brought into close contact with the magnetic recording medium to be preformatted, i.e. the slave medium, and the ferromagnetic material of the convex portions is excited. Then, a predetermined preformat information is recorded on the slave medium. By this method, static recording can be achieved without changing relative positions of the master carrier and the slave medium, and accurate preformat recording can be performed. Also, this method is characterized in that the time required for the recording is very short.

This magnetic transfer method is a method to transfer by bringing the master carrier for magnetic transfer and the slave medium in stationary condition. In this respect, damage occurs less frequently on the master carrier and the slave medium in the process for recording the servo signal, and this method is considered as a method to provide high durability.

As the magnetic material used for the master carrier for magnetic transfer, a soft magnetic material is used. Initially, it has been believed that magnetic permeability of the magnetic layer gives extensive influence on the transfer property, and the priority has been given on high magnetic permeability when the material is selected. However, signal quality is in marginal region, and it is necessary to improve the signal quality further. Also, transfer magnetic field intensity region where magnetic transfer of the signal of good quality can be accomplished is very narrow, and there are problems relating to the facilities.

It is an object of the present invention to provide a magnetic transfer method, by which it is possible to increase the quality of the signal transferred when a recording information recorded on the carrier for magnetic transfer is transferred to the slave medium and which can provide extensive transfer magnetic field intensity region.

SUMMARY OF THE INVENTION

The present invention provides a magnetic transfer method, wherein a product (Ms·δ) of saturation magnetization (Ms) and magnetic layer thickness (δ) of a magnetic material of a master carrier for magnetic transfer is within the range of 0.025 T·μm (20 G·μm)–2.3 T·μm (1830 G·μm) inclusive.

Further, the present invention provides a magnetic transfer method as described above, wherein the master carrier for magnetic transfer having a magnetic layer where a magnetic recording information is recorded is brought into close contact with the slave medium where the information is to be transferred, and the magnetic recording information on the master carrier for magnetic transfer is transferred to the slave medium, whereby, after initial DC magnetization of the slave medium in track direction, the master carrier for magnetic transfer is brought into close contact with the slave medium already processed by initial DC magnetization, a transfer magnetic field is applied in a direction opposite to the direction of the initial DC magnetization on the slave surface, and magnetic transfer is performed.

Also, the present invention provides a magnetic recording medium with servo signal recorded thereon by the above method.

DESCRIPTION OF THE PREFERRED EMBODIMENT

In a magnetic transfer method for transferring an information to a magnetic recording medium, it has been found in the present invention that, when a magnetic material having a product, i.e. (Ms·δ), of saturation magnetization (Ms) and magnetic layer thickness (δ) of the magnetic material of a master carrier for magnetic transfer is in the range of 0.025 T·μm (20 G·μm)–2.3 T·μm (1830 G·μm) inclusive is used as a magnetic layer of the master carrier for magnetic transfer and recording is performed, quality of the transfer signal can be improved and also that narrowness of transfer magnetic field in the magnetic transfer can be improved.

As the magnetic material for the master carrier for magnetic transfer, a soft magnetic material is used. Initially, it has been believed that the easiness of magnetic field to enter a magnetic layer, i.e. magnetic permeability, exerts extensive influence on the transfer property, and the priority was given to high magnetic permeability when selecting the magnetic material. Also, signal quality is in marginal region, and it is necessary to improve signal quality further. The transfer magnetic field to provide the signal of good quality for magnetic transfer is very narrow, and hence, there have been problems in practical application.

However, in a magnetic transfer method for transferring magnetic recording information to a slave medium by bringing the master carrier for magnetic transfer into close contact with the slave medium where the information is to be transferred, the magnetic field on a pattern of the recording information on the master carrier for magnetic transfer is converged into the pattern and it is released at the end of the pattern. Then, by inverting the magnetization on the slave medium except the pattern portion, the recording information is transferred to the slave medium.

In this transfer method, the magnetization on the master carrier for magnetic transfer is in saturation region. Thus, it appears that, in unsaturated region, properties of the magnetic layer such as magnetic permeability, relative permeability, etc. may not give substantial influence on the transfer property. What governs the property of the magnetic layer of the master carrier for magnetic transfer in the saturation region is the factors such as saturation magnetization.

Also, the amount of magnetic flux convergence per unit volume is proportional to saturation magnetization of the magnetic material. In the magnetic transfer, the amount of magnetic flux to be emitted from the pattern exerts influence on the transfer property. For this reason, it is considered that not only the saturation magnetization (Ms) but also magnetic layer thickness (δ) give influence on the characteristics. In this respect, the range of transfer magnetic field and signal quality were evaluated using plane magnetic moment expressed by a product (Ms·δ) of saturation magnetization (Ms) and film thickness (δ) as parameter. As a result, it was found that there is an optimal range for the value of Ms·δ.

In a region where the value of Ms·δ is less than 0.025 T·μm (20 G·μm), transfer magnetic field is not converged within the master pattern, and magnetization inversion boundary region between signals is expanded. As a result, the signal quality is decreased, and transfer magnetic field region is narrowed down.

On the other hand, in a region where the value of Ms·δ exceeds 2.3 T·μm (1830 G·μm), transfer magnetic field region and signal quality are increased while a transfer magnetic field to slightly magnetize the slave medium is generated even when transfer magnetic field is not applied because of residual magnetization of magnetic pole of an electromagnet used for magnetic transfer. For this reason, it was found that, when the slave medium is taken out after the magnetic transfer, the transfer signal is disturbed and the signal quality is decreased.

Based on the result of the above analysis, it was found that the quality of the recorded signal can be improved and the transfer magnetic field region can be expanded when the following magnetic material is used as the master carrier for magnetic transfer: a magnetic material, in which a product (Ms·δ) of saturation magnetization (Ms) and magnetic layer thickness (δ) of the magnetic material of the master carrier is within the range of 0.025 T·μm (20 G·μm)–2.3 T·μm (1830 G·μm) inclusive.

The master carrier for magnetic transfer used in the magnetic transfer method of the present invention can be manufactured by the following procedure:

As a substrate for the master carrier for magnetic transfer, a material with smooth surface such as silicon, aluminum, glass, synthetic resin, etc. may be used.

First, photo resist is coated on the substrate, and a resist pattern complying with the pattern to be formed by the magnetic transfer is formed by pattern exposure or by direct marking.

In case of the pattern exposure, the pattern is formed on the substrate by reactive etching, or physical etching using argon plasma or etching by liquid.

Next, a magnetic layer is formed in a predetermined thickness on a predetermined position by sputtering. Then, the photo resist is removed by lift-off method. Only a convex magnetic layer coming into contact with the slave medium in the magnetic transfer may be provided by photo-lithography.

Also, stamper fabrication and injection molding may be used as a method for fine fabrication.

Description is given now on injection molding method. While a glass substrate coated with photo resist is rotated, a laser beam modulated to correspond to the servo signal is irradiated, and the photo resist is exposed to light over the entire glass surface. Then, the resist is developed and glass substrate is developed, and surface irregularities (concave and convex portions) are formed on the glass surface. Then, the resist is removed, and plating is performed on the glass substrate with surface irregularities, and an original plated board with surface irregularities is prepared.

As the material for the plated board, nickel or nickel alloy may be used. Also, to improve durability of the original plated board, a carbon film such as diamond-like carbon may be formed by sputtering.

A resin substrate with a pattern formed on it is prepared by the method such as injection molding using the original plated board. As the resin material, acrylic resin such as polycarbonate, polymethyl methacrylate, etc., vinyl chloride resin such as polyvinyl chloride-vinyl chloride copolymer, etc., epoxy resin, amorphous polyolefin, and polyester, etc. may be used. From the viewpoints of moisture resistance, dimensional stability and price, it is preferable to use polycarbonate. When the original plated board has burrs, these burrs are removed by burnishing or polishing. Groove depth of the pattern is preferably within the range of 50–1000 nm, or more preferably 200–500 nm.

As the magnetic material, the following materials may be used: Co, Co alloy (such as CoNi, CoNiZr, CoNbTaZr, etc.), Fe, Fe alloy (such as FeCo, FeCoNi, FeNiMo, FeAlSi, FeAl, FeTaN), Ni, Ni alloy (such as NiFe). More preferably, FeCo or FeCoNi may be used.

Prior to the formation of the magnetic layer of the master carrier for magnetic transfer to be used in the magnetic transfer method of the present invention, it is preferable to provide a nonmagnetic primer layer, and it is also preferable that crystal structure and lattice constant of the primer layer are equalized with those of the magnetic layer.

As the material for forming the primer layer, Cr, CrTi, CoCr, CrTa, CrMo, NiAl, Ru, etc. may be used.

A protective film such as diamond-like carbon (DLC) may be provided on the magnetic layer or a lubricant layer may be arranged.

In particular, it is preferable to provide a diamond-like carbon film of 5–30 nm and a lubricant as the protective film.

When lubricant is present, durability can be increased even when friction occurs in case deviation is corrected during contact process between the master carrier and the slave medium.

The magnetic material of the master carrier for magnetic transfer preferably has a product (Ms·δ), i.e. a product of saturation magnetization (Ms) and magnetic layer thickness (δ), within the range of 0.025 T·μm (20 G·μm)–2.3 T·μm (1830 G·μm) inclusive. Or, more preferably in the range of 0.05 T·μm (40 G·μm)–2.0 T·μm (1591 G·μm) inclusive. The value of Ms·δ of the master magnetic layer can be adjusted by the adjustment of saturation magnetization of the magnetic layer material, magnetic layer thickness, manufacturing temperature, type of gas used during sputtering, etc.

The value of Ms can be adjusted by regulating the adding quantity of nonmagnetic element such as Cr, Ti, etc. Also, it can be adjusted by regulating the manufacturing temperature.

The uniformity of the master magnetic layer can be adjusted and the value of Ms can be adjusted by regulating the manufacturing temperature.

In case FeCo (atom ratio 65:35) is used, the value of Ms can be adjusted within the range of 2.0–2.3 T by setting the manufacturing temperature in the range of 20° C.–200° C.

Also, the value of Ms of the magnetic layer is adjusted by manufacturing the magnetic layer in mixed atmosphere such as argon, and oxygen, nitrogen etc., and by oxidizing or nitriding the magnetic layer. The value of Ms can be adjusted by regulating partial pressure of oxygen and nitrogen.

The thickness of the magnetic layer is preferably within the range of 50 nm–800 nm inclusive, or more preferably, in the range of 100 nm–500 nm inclusive.

In the following, description will be given on the slave medium used in the present invention.

As the slave medium, a coating type magnetic recording medium with ferromagnetic metal particles dispersed in a binder or a metal thin-film type magnetic recording medium with ferromagnetic metal thin film formed on substrate may be used.

As the coating type magnetic recording medium, a magnetic recording medium such as Zip 100 or Zip 250 for Zip (Iomega Inc.) or high density floppy disk called HiFD recording medium may be used.

It is preferable that coercive force (Hc) of the slave medium is 103 kA/m (1300 Oe) or more and less than 470 kA/m (6000 Oe). More preferably, it is 127 kA/m (1600 Oe) or more and less than 398 kA/m (5000 Oe). In case coercive force (Hc) of the slave medium is less than 103 kA/m, it is not possible to retain high density recording information of 1 Gb per 6.45 cm$^2$ or more (1 Gb/square inch or more). On the contrary, if it is 470 kA/m or more, no magnetic recording head is available which can record data on the slave medium.

As the metal thin film type magnetic recording medium, the following material can be used as the magnetic material: Co, Co alloy (such as CoPtCr, CoCr, CoPtCrTa, CoPtCrNbTa, CoCrB, CoNi), Fe, Fe alloy (such as FeCo, FePt, FeCoNi). To achieve clear and definite transfer, it is essential that the material has high magnetic flux density and magnetic anisotropy in the same direction as the magnetic layer of the master carrier, i.e. in in-plane direction if it is in-plane recording, and in vertical direction if it is vertical recording.

To form magnetic anisotropy required on the lower portion of the magnetic layer, i.e. on substrate side, it is preferable to provide a nonmagnetic primer layer. Also, it is preferable that crystal structure and lattice constant are equalized with those of the magnetic layer.

More concretely, as the material for forming the primer layer, Cr, CrTi, CoCr, CrTa, CrMo, Ni, Ru, etc. may be used.

Now, description will be given on several examples to explain the present invention.

EXAMPLE 1

For a 3.5 type master carrier for magnetic transfer, a magnetic layer of 200 nm in thickness comprising FeCo (atom ratio Fe:Co=70:30) was formed using a silicon wafer disk as substrate. The pattern was set to radial line with equal spacing of 5 μm in width from the center of the disk to a position of 20–40 mm in radial direction, and line spacing was set to 8 μm at the innermost peripheral position of 20 mm in radial direction.

The magnetic layer was formed by DC sputtering method using a sputtering system (manufactured by Anerva Co.; 730H). Manufacturing temperature was set to 25° C., argon sputtering pressure to $5.0 \times 10^{-4}$ Pa (0.36 mTorr), and the power supplied was 2.80 W/cm$^2$.

For the adjustment of film thickness, magnetic material was formed for 10 minutes on a silicon substrate with marking. This specimen was washed with acetone, and the marking was removed. Graded step in the film thickness on this portion was measured by a contact type step meter, and sputtering speed was calculated from the relation between film thickness and sputtering time. Next, the time required for forming the desired film thickness was calculated from the sputtering speed, and film was formed for the duration time as required.

As the slave medium, a coating type magnetic medium (manufactured by Fuji Photo Film Co., Ltd.) for Zip 250 (Iomega Inc.) as commercially marketed was used. Coercive force (Hc) of the slave medium was 199 kA/m (2500 Oe).

After initial DC magnetization of the slave medium at 398 kA/m (5000 Oe), the master carrier for magnetic transfer and the slave medium were brought into close contact with each other. Transfer magnetic field with intensity of 199 kA/m (2500 Oe) was applied in a direction opposite to the direction of the initial DC magnetization, and a recording information was transferred to the slave medium. The slave medium thus obtained was evaluated by the evaluation method given below, and the magnetic transfer information was evaluated.

EXAMPLE 2

A master carrier for magnetic transfer of Example 2 was prepared by the same procedure as in Example 1 except that the magnetic layer thickness of the master carrier for magnetic transfer of Example 1 was changed to 400 nm. Magnetic transfer was performed by the same procedure as in Example 1, and evaluation was made.

EXAMPLE 3

A master carrier for magnetic transfer of Example 3 was prepared by the same procedure as in Example 1 except that the magnetic layer of the master carrier for magnetic transfer in Example 1 was changed to CoFeNi (atom ratio 65:22:13). Magnetic transfer was performed by the same procedure as in Example 1, and evaluation was made.

EXAMPLE 4

A master carrier for magnetic transfer of Example 4 was prepared by the same procedure as in Example 1 except that the magnetic layer of the master carrier for magnetic transfer of Example 1 was changed to Ni. Magnetic transfer was performed by the same procedure as in Example 1, and evaluation was made.

EXAMPLE 5

A master carrier for magnetic transfer of Example 5 was prepared by the same procedure as in Example 1 except that the condition of the sputtering atmosphere of the magnetic layer of the master carrier for magnetic transfer of Example 1 was changed to argon partial pressure of $5.0 \times 10^{-4}$ Pa (0.36 mTorr) and oxygen pressure of $3.0 \times 10^{-5}$ (0.022 mTorr). Magnetic transfer was performed by the same procedure as in Example 1, and evaluation was made.

EXAMPLE 6

A master carrier for magnetic transfer of Example 6 was prepared by the same procedure as in Example 1 except that the condition of the sputtering atmosphere of the magnetic layer of the master carrier for magnetic transfer of Example 1 was changed to argon partial pressure of $5.0 \times 10^{-4}$ Pa (0.36 mTorr) and nitrogen pressure of $3.0 \times 10^{-5}$ (0.022 mTorr). Magnetic transfer was performed by the same procedure as in Example 1, and evaluation was made.

COMPARATIVE EXAMPLE 1

A master carrier for magnetic transfer of Comparative example 1 was prepared by the same procedure as in Example 4 except that the thickness of the magnetic layer of the master carrier for magnetic transfer in Example 4 was changed to 100 nm. Magnetic transfer was performed by the same procedure as in Example 1, and evaluation was made.

COMPARATIVE EXAMPLE 2

A master carrier for magnetic transfer of Comparative example 2 was prepared by the same procedure as in Example 1 except that the thickness of the magnetic layer of the master carrier for magnetic transfer of Example 1 was changed to 30 nm. Magnetic transfer was performed by the same procedure as in Example 1, and evaluation was made.

COMPARATIVE EXAMPLE 3

A master carrier for magnetic transfer of Comparative example 3 was prepared by the same procedure as in Example 1 except that the thickness of the magnetic layer of the master carrier for magnetic transfer of Example 1 was changed to 800 nm. Magnetic transfer was performed by the same procedure as in Example 1, and evaluation was made.

COMPARATIVE EXAMPLE 4

A master carrier for magnetic transfer of Comparative example 4 was prepared by the same procedure as in Example 1 except that the thickness of the magnetic layer of the master carrier for magnetic transfer of Example 1 was changed to 1000 nm. Magnetic transfer was performed by the same procedure as in Example 1, and evaluation was made.

COMPARATIVE EXAMPLE 5

A master carrier for magnetic transfer of Comparative example 5 was prepared by the same procedure as in Example 3 except that the sputtering atmosphere of the magnetic layer of the master carrier for magnetic transfer of Example 3 was changed to oxygen. Magnetic transfer was performed by the same procedure as in Example 1, and evaluation was made.

COMPARATIVE EXAMPLE 6

A master carrier for magnetic transfer of Comparative example 6 was prepared by the same procedure as in Example 1 except that the sputtering atmosphere of the magnetic layer of the master carrier for magnetic transfer of Example 1 was changed to oxygen. Magnetic transfer was performed by the same procedure as in Example 1, and evaluation was made.

(Evaluation Methods)

1. Measurement of Saturation Magnetization and Calculation of Ms·δ

Saturation magnetization (Ms) of the magnetic layer is determined using a specimen vibration type magnetometer (VSM). Also, the specimen is cut in the size of 8 mm×6 mm, and magnetic layer thickness (δ) is calculated from the area and the sputtering speed, and volume and saturation magnetization are calculated from the magnetic layer thickness (δ).

The value of Ms·δ is calculated from a product of Ms and δ obtained by the above procedure.

2. Measurement of the Extent of Transfer Magnetic Field Region

A magnetic developing solution (Sigmarker Q; Sigma Hichemical Co.,) is diluted by 15 times, and this is dropped on the slave medium after magnetic transfer. After drying, it is developed. After development, the magnetic transfer image is checked by visual inspection. The difference between the magnetic intensity where signals are generated and disappear is regarded as the transfer magnetic field region.

3. Measurement of Electromagnetic Transfer Characteristics

Using an electromagnetic characteristics measuring system (Kyodo Electronics Co.; SS-60), signal quality of transfer signal on the slave medium was evaluated. Reproduction signal of the system was inputted to a digital oscilloscope (LeCroy: LC334AM), and evaluation was made by half-value (PW50) of the signal. When PW50 was 300 nm or less, it was defined as "good". If it is more than this value, it was defined as "no good".

TABLE 1

| | Ms · δ Plane magnetic moment (T · μm) | Transfer magnetic field region (kA/m) | Signal quality | PW50 (nm) |
|---|---|---|---|---|
| Example 1 | 0.4 | 200 | Good | 288 |
| Example 2 | 0.8 | 223 | Good | 274 |
| Example 3 | 0.42 | 179 | Good | 282 |
| Example 4 | 0.1 | 143 | Good | 299 |
| Example 5 | 0.06 | 210 | Good | 276 |
| Example 6 | 0.04 | 203 | Good | 277 |
| Comparative example 1 | 0.015 | 64 | No good | 315 |
| Comparative example 2 | 0.02 | 81 | No good | 319 |
| Comparative example 3 | 2.4 | 223 | No good | 304 |
| Comparative example 4 | 3.2 | 227 | No good | 309 |
| Comparative example 5 | 0.01 | 21 | No good | 412 |
| Comparative example 6 | 0.006 | 16 | No good | 395 |

As described above, according to the magnetic transfer method using the master carrier for magnetic transfer of the present invention, it is possible to perform stable magnetic transfer of preformat recording of servo signal for tracking and address information signal, reproduction clock signal, etc. within short time and with high productivity to a disk type medium such as hard disk, large capacity removable disk medium, large capacity flexible medium, etc. without decreasing the quality of the transfer signal.

What is claimed is:

1. A magnetic transfer method, wherein a product (Ms·δ) of saturation magnetization (Ms) and magnetic layer thickness (δ) of a magnetic material of a master carrier for magnetic transfer is within the range of 0.025 T·μm (20 G·μm)–2.3 T·μm (1830 G·μm) inclusive.

2. A magnetic transfer method according to claim 1, wherein the master carrier for magnetic transfer having a magnetic layer where a magnetic recording information is recorded is brought into close contact with the slave medium where the information is to be transferred, and the magnetic recording information on the master carrier for magnetic transfer is transferred to the slave medium, whereby, after initial DC magnetization of the slave medium in track direction, the master carrier for magnetic transfer is brought into close contact with the slave medium already processed by initial DC magnetization, a transfer magnetic field is applied in a direction opposite to the direction of the initial DC magnetization on the slave surface, and magnetic transfer is performed.

3. A magnetic recording medium with servo signal recorded thereon, whereby magnetic transfer of the servo signal is performed and recorded using a master carrier for magnetic transfer, which has a magnetic material having a product (Ms·δ) of saturation magnetization (Ms) and the magnetic layer thickness (δ) within the range of 0.025 T·μm (20 G·μm)–2.3 T·μm (1830 G·μm) inclusive.

4. A magnetic recording medium with a servo signal recorded thereon, whereby a master carrier for magnetic transfer is brought into close contact with a slave medium where information is to be transferred, said master carrier has a magnetic material having a product (Ms·δ) of saturation magnetization (Ms) and magnetic layer thickness (δ) within the range of 0.025 T·μm (20 G·μm)–2.3 T·μm (1830 G·μm) inclusive, magnetization of the slave medium is processed by DC magnetization in track direction, and the master carrier for magnetic transfer is brought into close contact with the slave medium after the initial DC magnetization, and servo signal is recorded by applying transfer magnetic field in a direction opposite to the direction of the initial DC magnetization of the slave surface.

* * * * *